(12) United States Patent
Wang

(10) Patent No.: US 11,549,587 B2
(45) Date of Patent: Jan. 10, 2023

(54) SEALING DEVICE, SEALING ASSEMBLY AND APPARATUS HAVING A ROTATING SHAFT WITH THE SEALING ASSEMBLY

(71) Applicant: Chengli Li, Suzhou (CN)

(72) Inventor: Shengyan Wang, Suzhou (CN)

(73) Assignee: Chengli Li, Suzhou (CN)

( * ) Notice: Subject to any disclaimer, the term of this patent is extended or adjusted under 35 U.S.C. 154(b) by 178 days.

(21) Appl. No.: 17/088,416

(22) Filed: Nov. 3, 2020

(65) Prior Publication Data
US 2022/0128148 A1 Apr. 28, 2022

(30) Foreign Application Priority Data

Oct. 23, 2020 (CN) .......................... 202011146979.5
Oct. 23, 2020 (CN) .......................... 202022393266.0

(51) Int. Cl.
*F16J 15/32* (2016.01)
*F16J 15/34* (2006.01)

(52) U.S. Cl.
CPC ............... *F16J 15/32* (2013.01); *F16J 15/34* (2013.01)

(58) Field of Classification Search
CPC .................................. F16J 15/32; F16J 15/34
USPC ................................................... 277/390, 402
See application file for complete search history.

(56) References Cited

U.S. PATENT DOCUMENTS

| 3,467,395 | A | * | 9/1969 | Yoshiro | F16J 15/3268 |
| | | | | | 277/925 |
| 4,136,885 | A | * | 1/1979 | Uhrner | F16J 15/348 |
| | | | | | 277/374 |
| 4,765,227 | A | * | 8/1988 | Balazs | F16J 15/3232 |
| | | | | | 277/572 |
| 5,013,051 | A | * | 5/1991 | Hilaris | F16J 15/36 |
| | | | | | 277/379 |
| 5,053,661 | A | * | 10/1991 | Kitamura | F16J 15/3232 |
| | | | | | 310/90 |
| 5,370,401 | A | * | 12/1994 | Sandgren | F16J 15/3488 |
| | | | | | 277/306 |
| 6,457,720 | B1 | * | 10/2002 | London | F16J 15/3488 |
| | | | | | 277/374 |
| 7,090,221 | B2 | * | 8/2006 | Matsui | F16J 15/3456 |
| | | | | | 277/390 |
| 7,708,283 | B2 | * | 5/2010 | Azibert | F16J 15/3488 |
| | | | | | 403/322.2 |
| 7,959,157 | B2 | * | 6/2011 | Dobbs | F16J 15/3268 |
| | | | | | 277/572 |

(Continued)

*Primary Examiner* — Eugene G Byrd
*Assistant Examiner* — L. Susmitha Koneru
(74) *Attorney, Agent, or Firm* — Chen Yoshimura LLP

(57) ABSTRACT

A sealing device, sealing assembly and an apparatus having a rotation shaft that uses the sealing assembly. The sealing assembly includes a rotating shaft seal and a sealing device. The rotating shaft seal has a ring shaped body with the rotating shaft passing through it and a sealing portion forming a dynamic sealing cooperation with the rotating shaft. The sealing device includes a ring shaped body with the rotating shaft passing through it, and includes first and second ring shaped portions spaced apart from each other in an axial direction. The first ring shaped portion defines a static sealing surface forming a static sealing cooperation with the rotating shaft, and the second ring shaped portion defines a dynamic sealing surface forming a dynamic sealing cooperation with a portion of the rotating shaft seal adjacent to the sealing portion of the rotating shaft seal.

17 Claims, 7 Drawing Sheets

(56) References Cited

U.S. PATENT DOCUMENTS

| | | | |
|---|---|---|---|
| 10,337,617 B2* | 7/2019 | Desjardins | F16J 15/3268 |
| 10,527,208 B2* | 1/2020 | Grouillet | F16L 17/035 |
| 11,022,180 B2* | 6/2021 | Mehmedovic | F16J 15/3464 |
| 2001/0054799 A1* | 12/2001 | McComb | A47K 3/008 |
| | | | 277/590 |
| 2016/0186863 A1* | 6/2016 | Wilkins | F16J 15/3248 |
| | | | 277/504 |

* cited by examiner

SEALING DEVICE, SEALING ASSEMBLY AND APPARATUS HAVING A ROTATING SHAFT WITH THE SEALING ASSEMBLY

BACKGROUND OF THE INVENTION

Field of the Invention

This invention relates to a sealing device and assembly for an apparatus having a rotating shaft, and in particular, it relates to a sealing device that rotates together with a rotating shaft seal, a sealing assembly for a rotating shaft, and an apparatus having a rotating shaft with the sealing assembly.

Description of Related Art

A rotating shaft seal is a sealing device that can prevent the leaking of a pressurized fluid (such as a lubricating fluid). It is widely used in apparatuses that have a rotating shaft and that require oil-, gas- or water-tightness (such as gas turbines, steam turbines, water turbines, pumps, home appliances, motors, motorcycles, etc.). However, when a rotating shaft seal is installed on a rotating shaft, for areas of direct contact between the rotating shaft and the seal (e.g., at or near the sealing lip), external contaminants (such as dust, other contaminants, etc.) may enter such areas when the rotating shaft rotates, which exacerbates wear of the rotating shaft and the rotating shaft seal. This may in turn cause the rotating shaft seal to fail.

In conventional technologies, one solution is to use mechanical seals. However, a shortcoming of mechanical seals is that when they are worn, they require replacement and maintenance performed by professional service personnel from the manufacturer. Thus, their installation and maintenance are complicated and costly. Another solution is to use multiple (e.g., two, three, etc.) rotating shaft seals. A shortcoming of this solution is that it has a complex structure and high cost, and still cannot effectively prevent entrance of external contaminants. It can only delay the entrance of the external contaminants by a limited amount of time, and the amount of time delay is not proportional to the number of rotating shaft seals used.

SUMMARY

To solve the above problem, namely, the problem of excessive wear of the rotating shaft seal in the areas of direct contact between the rotating shaft and the seal due to external contaminants entering that area, embodiments of the present invention provide a sealing device for use with a rotating shaft seal, a sealing assembly for a rotating shaft, and an apparatus having a rotating shaft with the sealing assembly.

In a first aspect, the present invention provides a sealing device for use with a rotating shaft seal to seal a rotating shaft, wherein the rotating shaft seal includes a ring shaped body with the rotating shaft passing through it, and includes a sealing portion configured to form a dynamic sealing cooperation with the rotating shaft; the sealing device including: a ring shaped body, configured to accommodate the rotating shaft passing through it, the ring shaped body including a first ring shaped portion and a second ring shaped portion spaced apart from each other in an axial direction of a rotation axis of the rotating shaft, wherein the first ring shaped portion defines a static sealing surface configured to form a static sealing cooperation with the rotating shaft, and wherein the second ring shaped portion defines a dynamic sealing surface configured to form a dynamic sealing cooperation with a portion of the body of the rotating shaft seal that is adjacent to the sealing portion of the rotating shaft seal.

In a second aspect, the present invention provides a sealing assembly for use with a rotating shaft, the sealing assembly including: a rotating shaft seal, having a ring shaped body configured to accommodate the rotating shaft passing through it, and including a sealing portion configured to form a dynamic sealing cooperation with the rotating shaft; a sealing device, which includes: a ring shaped body, configured to accommodate the rotating shaft passing through it, the ring shaped body including a first ring shaped portion and a second ring shaped portion spaced apart from each other in an axial direction of a rotation axis of the rotating shaft, wherein the first ring shaped portion defines a static sealing surface configured to form a static sealing cooperation with the rotating shaft, and wherein the second ring shaped portion defines a dynamic sealing surface configured to form a dynamic sealing cooperation with a portion of the body of the rotating shaft seal that is adjacent to the sealing portion of the rotating shaft seal.

In first or second aspect, the sealing device or sealing assembly may have the following preferred embodiments.

In some embodiments, the ring shaped body further includes a transition portion that connects the first ring shaped portion and the second ring shaped portion, where the transition portion defines an inner surface that is concave in a cross-section that passes through the rotation axis of the rotating shaft.

In some embodiments, the second ring shaped portion further includes a connecting surface disposed between the concave surface and the dynamic sealing surface.

In some embodiments, the connecting surface is configured to form a gap between the connecting surface and the rotating shaft.

In some embodiments, the ring shaped body further includes a flange structure extending from an outer end of the dynamic sealing surface, wherein the flange structure extends parallel to the rotation axis towards the rotating shaft seal when the dynamic sealing surface and the body of the rotating shaft seal form a dynamic sealing cooperation.

In some embodiments, the second ring shaped portion includes a flexible material.

In a third aspect, the present invention provides an apparatus including a rotating shaft and the sealing assembly of the second aspect.

In a fourth aspect, the present invention provides an apparatus which includes a rotating shaft, and: a rotating shaft seal, having a ring shaped body configured to accommodate the rotating shaft passing through it, and including a sealing portion configured to form a dynamic sealing cooperation with the rotating shaft; a sealing device, which includes: a ring shaped body, configured to accommodate the rotating shaft passing through it, wherein the ring shaped body defines a static sealing surface configured to form a static sealing cooperation with the rotating shaft, and defines a dynamic sealing surface configured to form a dynamic sealing cooperation with a portion of the body of the rotating shaft seal that is adjacent to the sealing portion of the rotating shaft seal.

In fourth aspect, the apparatus may have the following preferred embodiments.

In some embodiments, the ring shaped body of the sealing device includes a flexible material.

In some embodiments, the ring shaped body of the sealing device further defines a connecting surface which connects the static sealing surface and the dynamic sealing surface, wherein the connecting surface has a curved shape in a cross-section that passes through the rotation axis of the rotating shaft.

Compared to conventional technology, the sealing device and sealing assembly according to embodiments of the present invention can effectively prevent wear of the rotating shaft seal and the rotating shaft due to external contaminants, thereby extending the life of the rotating shaft seal and rotating shaft. The sealing device can be easily integrated into the apparatus that has a rotating shaft with a dynamic sealing structure. The parts are easy to replace and maintain, and has a relatively low cost.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Some terminologies used in this disclosure are explained first. Here, a rotating shaft seal may also be referred to as a rotating shaft oil seal, which is sealing structure for a rotating shaft and is different from typical mechanical seals. The rotating shaft seal functions as a physical barrier to keep a fluid, for example, a lubricating oil, within a certain location, and prevent the fluid from leaking even under a certain pressure (e.g. a high pressure).

As described earlier, when a rotating shaft seal is installed on a rotating shaft, external contaminants (such as dust, other contaminants, etc.) may enter the areas of direct contact between the rotating shaft and the seal (e.g., at or near the sealing lip) when the rotating shaft rotates, which exacerbates wear of the rotating shaft and the rotating shaft seal. This may in turn cause the rotating shaft seal to fail.

Figure 1:
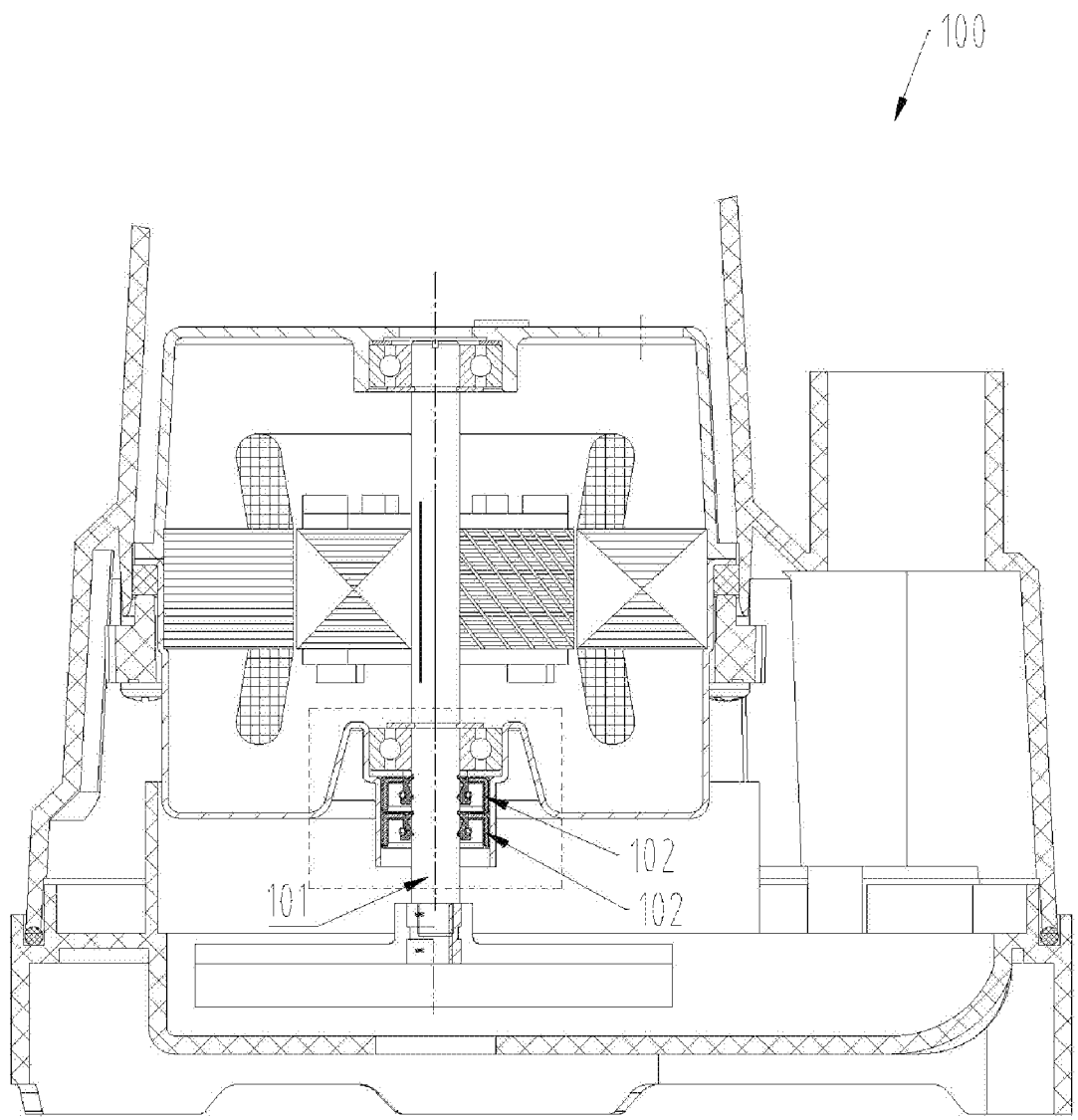
FIG. 1 is a cross-sectional view that illustrates an apparatus having a sealing assembly for a rotating shaft according to a conventional technology.
Figure 2:
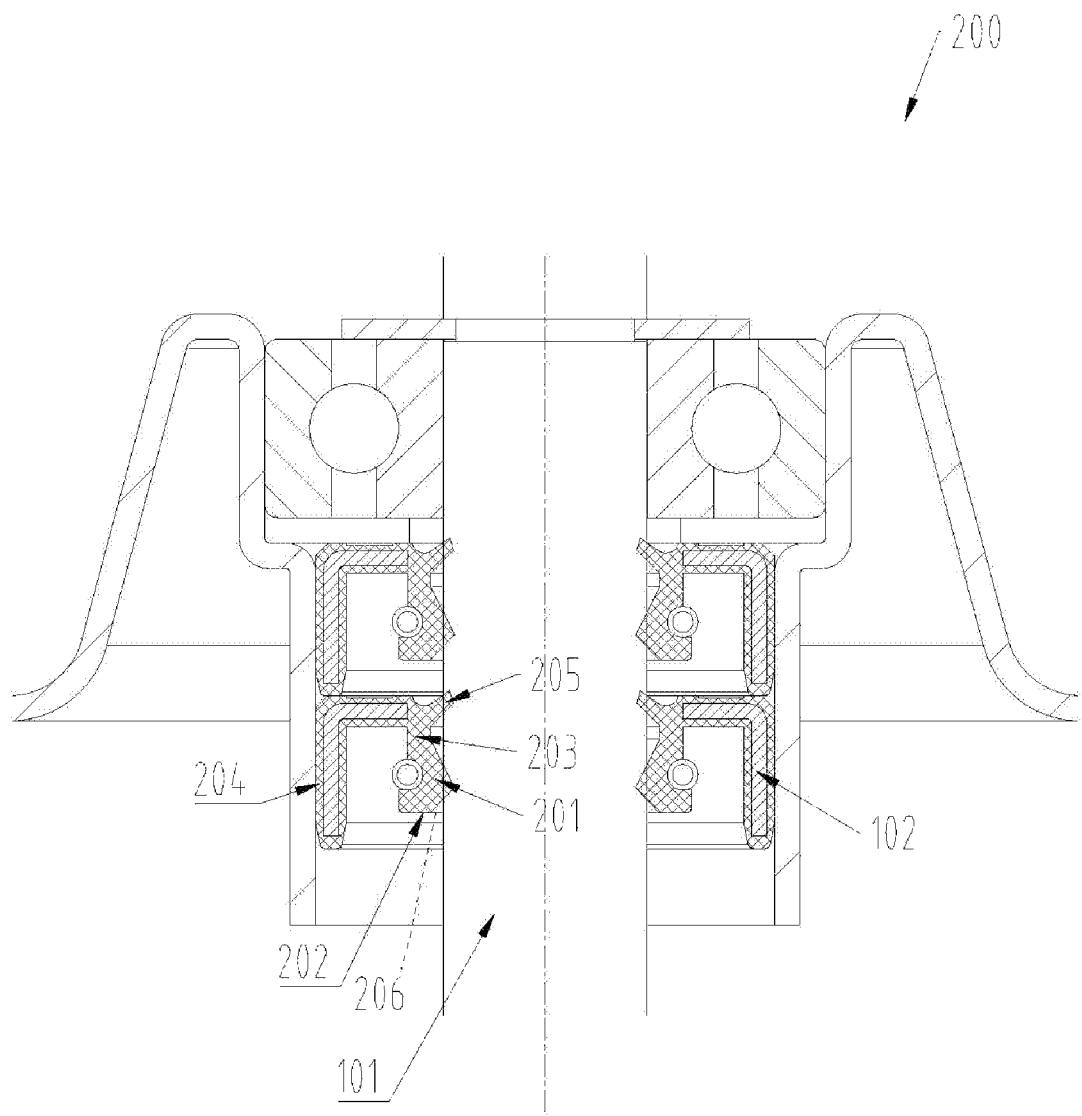
FIG. 2 is an enlarged cross-sectional view of a portion of the sealing assembly of FIG. 1.

Conventional technologies typically uses two or more rotating shaft seals to solve the above problem. FIG. 1 is a cross-sectional view that illustrates an apparatus 100 having a sealing assembly for a rotating shaft according to a conventional technology, and FIG. 2 is an enlarged cross-sectional view of a portion 200 of the sealing assembly of FIG. 1. All cross-sectional views in this disclosure are in a plane that passes through a rotation axis of the rotating shaft.

Referring to FIG. 1, the apparatus 100 includes a rotating shaft 101 and multiple rotating shaft seals 102 (two are shown). The rotating shaft 101 rotates around the rotational axis. The rotating shaft seal 102 passes through the rotating shaft 101 and is co-axial with the rotating shaft 101. The multiple rotating shaft seals 102 constitute a rotating shaft sealing assembly.

Referring to FIG. 2, the rotating shaft seal 102 includes a body, which is configured to have the rotating shaft 101 pass through it, and includes a sealing portion 201 (e.g. a sealing lip). The sealing portion 201 directly contacts the rotating shaft 101 and forms a dynamic sealing cooperation with the rotating shaft, i.e., the rotating shaft seal 102 does not rotate in synchrony with the rotating shaft 101. Preferably, the diameter of the center opening of the rotating shaft seal 102 at the sealing portion 201 (as well as at the dust guard 205, described in more detail below) is slightly smaller than the outer diameter of the rotating shaft 101, and at least the sealing portion 201 (as well as the dust guard 205 if provided) of the rotating shaft seal 102 is made of a flexible and deformable material, so that a tight contact is formed between the sealing portion 201 (and the dust guard 205 if provided) and the rotating shaft 101. Preferably, the rotating shaft seal 102 is affixed to and stationary relative to the non-rotating portions of the apparatus. The body further includes a neighboring portion 202 adjacent the sealing portion 201, which is not in contact with the rotating shaft 101. Because of the dynamic sealing cooperation, during rotation, the parts of the rotating shaft 101 and the rotating shaft seal 102 (the sealing portion 201) that directly contact each other will move relative to each other and experience wear. In some conditions, for example, when the rotation speed changes or the environmental temperature changes, dry friction may occur between the rotating shaft 101 and the sealing portion 201 of the rotating shaft seal 102, causing more serious wear. When external contaminants (e.g. dust, other contaminants, etc.) enter the area near the neighboring portion 202, for example, along the path indicated by the dashed line 206, they exacerbate the wear between the rotating shaft 101 and the sealing portion 201 of the rotating shaft seal 102. This may cause the rotating shaft seal 102 to fail. By using multiple serially arranged rotating shaft seals 102 for the rotating shaft 101, when one rotating shaft seal 102 fails due to external contaminants and wear, other rotating shaft seals 102 can still function to seal the rotating shaft. This offers resistance to damage caused by external contaminants.

For example and without limitation, using a skeleton oil seal as an example of the rotating shaft seal 102, the seal includes a body formed of an elastic material (such as rubber, elastic plastic, etc.). The body includes an inner ring 203 and an outer ring 204 radially spaced apart, where the inner ring 203 defines a protruding sealing portion 201 (e.g. a sealing lip). A lubricating oil is disposed on one side of the sealing portion 201, and a layer of a stable hydrodynamic oil film is formed at the lubricating interface between the sealing portion 201 and the rotating shaft 101. Such an oil film typically has a certain pressure and can prevent the lubricating oil from flowing to the other side. The body may further include a spring embedded in the inner ring 203 to increase the self-tightening force of the rotating shaft seal 102. The body may further include a metal frame embedded in the outer ring 204 and the part that connects the outer ring 204 and the inner ring 203. The metal frame functions to increase the mechanical strength of the rotating shaft seal 102 and serves to position the rotating shaft seal 102 during installation. The body may further include a dust guard 205 (e.g. a dust proof lip), to prevent dust or other contaminant from entering one side of the sealing portion 201 from above. However, the dust guard 205 cannot prevent dust or other contaminants from entering an area on the other side of the sealing portion 201 from below. When external contaminants (e.g. dust, other contaminants, etc.) enter the area near the neighboring portion 202 near the sealing portion 201, for example, along the path indicated by the dashed line 206, they exacerbate the wear between the rotating shaft 101 and the sealing portion 201 of the rotating shaft seal 102. This may cause the rotating shaft seal 102 to fail.

However, no matter how many rotating shaft seals 102 are used or the types used, the structure will be complex and the cost high, and it still cannot effectively prevent contamination by external contaminants. It can only delay the entrance of the external contaminants by a limited amount of time, and the amount of time delay is not proportional to the number of rotating shaft seal used.

To solve the above problem of the conventional technology, i.e. excessive wear and failure of the rotating shaft seal due to external contaminants entering the areas of direct contact between the rotating shaft and the seal that area, embodiments of the present invention provide a sealing device for use with a rotating shaft seal, a sealing assembly for a rotating shaft, and an apparatus having a rotating shaft with the sealing assembly.

Figure 3:
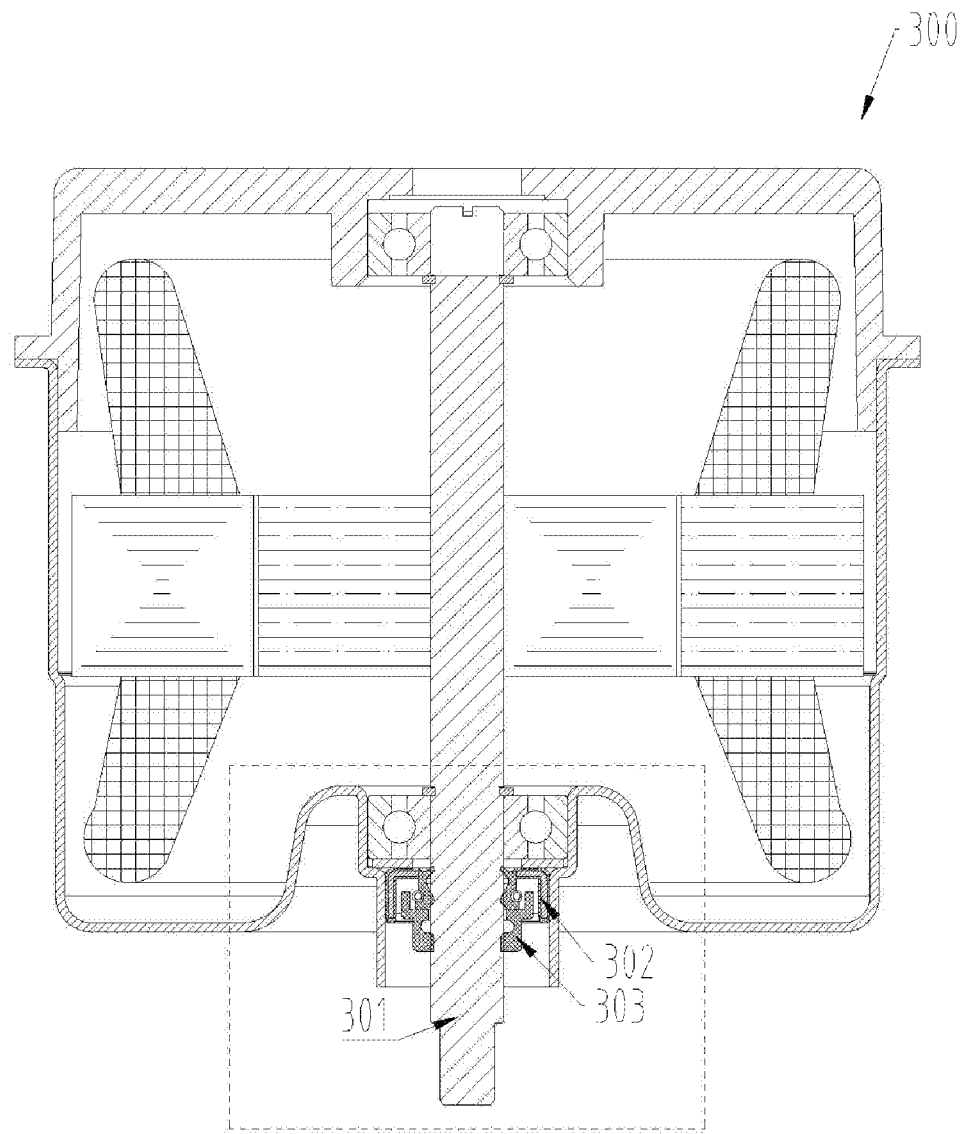
FIG. 3 is a cross-sectional view that illustrates an apparatus having a sealing assembly for a rotating shaft according to an embodiment of the present invention.

FIG. 3 is a cross-sectional view that illustrates an apparatus 300 having a sealing assembly for a rotating shaft according to an embodiment of the present invention. The apparatus 300 includes a rotating shaft 301, at least one rotating shaft seal 302 (one is shown), and a sealing device (sealing member) 303 used with the rotating shaft seal 302. The at least one rotating shaft seal 302 and the sealing device 303 collectively form a sealing assembly (sealing structure) for the rotating shaft 301. The rotating shaft 301 and the rotating shaft seal 302 may have similar structures as the rotating shaft 101 and the rotating shaft seal 102, respectively, shown in FIGS. 1 and 2 and described above; these components will not be described in further detail here.

Figure 4:
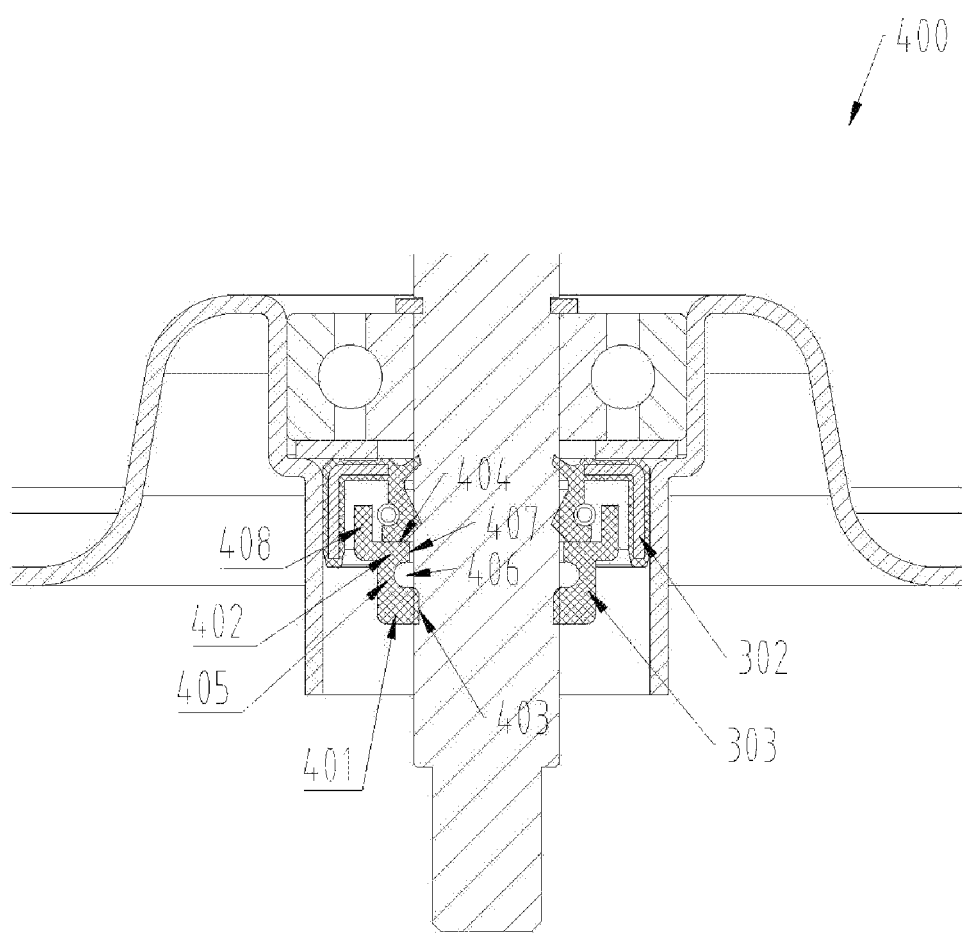
FIG. 4 is an enlarged cross-sectional view of a portion of the sealing assembly of FIG. 3.

FIG. 4 is an enlarged cross-sectional view of a portion 400 of the sealing assembly of the apparatus 300 of FIG. 3. The sealing device (sealing member) 303 includes a ring shaped body, configured to have the rotating shaft 301 pass through it. The ring shaped body includes a first ring shaped portion 401 and a second ring shaped portion 402 spaced apart from each other in the axial direction. The first ring shaped portion 401 defines a static sealing surface 403 which forms a static sealing cooperation with the rotating shaft 301; i.e., the static sealing surface 403 tightly contacts and surrounds the rotating shaft 301 and rotates in synchrony with the rotating shaft 301 (i.e., the entire sealing device 303 rotates in synchrony with the rotating shaft 301). For this purpose, the sealing device 303 may be affixed to the rotating shaft 301 by a suitable means, such as an adhesive or the tension in the sealing device itself. For example, the diameter of the center opening of the first ring shaped portion 401 at the static sealing surface 403 is slightly smaller than the outer diameter of the rotating shaft 301, and at least the static sealing surface 403 is made of a flexible and deformable material, so that a tight contact is formed between the static sealing surface 403 and the rotating shaft 301. The second ring shaped portion 402 defines a dynamic sealing surface 404 which forms a dynamic sealing cooperation with a portion of the body of the rotating shaft seal 302, such as the neighboring portion 202 that is adjacent to the sealing portion (e.g. the sealing portion 201) of the rotating shaft seal 302. For example, the dynamic sealing surface 404 tightly abuts (in directly contact with) the surface of the neighboring portion 202 of the body of the rotating shaft seal 302. Because the rotating shaft seal 302 does not rotate in synchrony with the rotating shaft 301, while the sealing device 303 does rotate in synchrony with the rotating shaft 301, the rotating shaft seal 302 and the sealing device 303 form a dynamic sealing cooperation. Because the sealing device 303 and the rotating shaft 301 form a static sealing with each other, there is no wear at the sealing interface. Further, the sealing device 303 and the rotating shaft seal 302 form a dynamic seal with each other, and the sealing device 303 can effectively prevent external contaminants from entering the area near the sealing portion of the rotating shaft seal 302 (e.g. along the path indicated by the dashed line 206), which in turn prevents wear of the rotating shaft seal and the rotating shaft, effectively extending the life of the rotating shaft seal and the rotating shaft. Moreover, the sealing device can be easily integrated into the apparatus that has a rotating shaft with a dynamic sealing structure. The parts are easy to replace and maintain, and has a relatively low cost.

In some embodiments, the ring shaped body of the sealing device 303 further includes a transition portion 405 that connects the first ring shaped portion 401 and the second ring shaped portion 402, where the transition portion 405 defines an inner surface 406 that is concave in the cross-sectional view. The concave surface 406 serves to relieve the stress generated at the contact surface due to deformation when the dynamic sealing surface 404 pushes against the body of the rotating shaft seal 302 to form the dynamic seal cooperation, thereby preventing deformation (e.g., displacement, or deformation of the sealing portion) of the rotating shaft seal 302 due to such stress. For example, when installing the sealing device 303, when the sealing device 303 is pushed along the rotation axis of the rotating shaft 301 (e.g. by pushing the first ring shaped portion 401) toward the rotating shaft seal 302, the concave surface 406 can prevent the dynamic sealing surface 404 from exerting too much force when it contacts the body of the rotating shaft seal 302. The deformation of the rotating shaft seal 302 can cause it to fail.

In some embodiments, the second ring shaped portion 402 further defines a connecting surface 407, disposed between the dynamic sealing surface 404 and the concave surface 406. In a further embodiment, the connecting surface 407 and the rotating shaft 301 have a gap between them. The connecting surface 407 can further relieve the stress generated due to the deformation when the dynamic sealing surface 404 contacts the body of the rotating shaft seal 302. The gap between the connecting surface 407 and the rotating shaft 301 can prevent any friction between them.

In some embodiments, the ring shaped body of the sealing device 303 further includes a flange structure 408 which extends from an outer end of the dynamic sealing surface 404, so that when the dynamic sealing surface 404 and the body of the rotating shaft seal 302 form a dynamic sealing cooperation, the flange structure 408 extends parallel to the axis towards the rotating shaft seal 302. The flange structure 408 can prevent external contaminates (e.g., dust, or other contaminates) from entering the dynamic sealing surface 404, and further prevent external contaminates from entering the area near the sealing portion of the rotating shaft seal 302, thereby prevention wear of the rotating shaft seal 302 and the rotating shaft 301. In addition, the flange structure 408 can effectively prevent the fluid (e.g. lubrication oil) disposed on one side of the rotating shaft seal 302 from leaking out. For example, when the rotating shaft seal 302 is a skeleton oil seal, the flange structure 408 may extend between the inner ring 203 and an outer ring 204 and toward the part that connects the inner ring and the outer ring.

In some embodiments, the second ring shaped portion 402 includes a flexible material. For example, the second ring shaped portion 402, or the entire ring shaped body, may include a flexible material. By providing the second ring shaped portion 402 formed of the flexible material, a flexible seal is formed between the dynamic sealing surface 404 and the body of the rotating shaft seal 302. This can maintain a stable sealing effect under the influence of vibration of the mechanical apparatus and the change in the elastic force of the contact surface, and at the same time, reduce wear caused by the dynamic sealing cooperation. The flexible material may be selected from, for example, rubber, silica gel, and soft plastic. The rubber may be, without limitation, nitrile rubber, acrylic rubber, silicone rubber, fluororubber, neoprene, etc.

The sealing device, sealing assembly and related apparatus incorporating the sealing assembly described above with reference to FIGS. 3 and 4 can effectively prevent wear of the rotating shaft seal and the rotating shaft due to external contaminants, thereby extending the life of the rotating shaft seal and rotating shaft. The sealing assembly is also relatively easy to install, replace and maintain.

Figure 5:
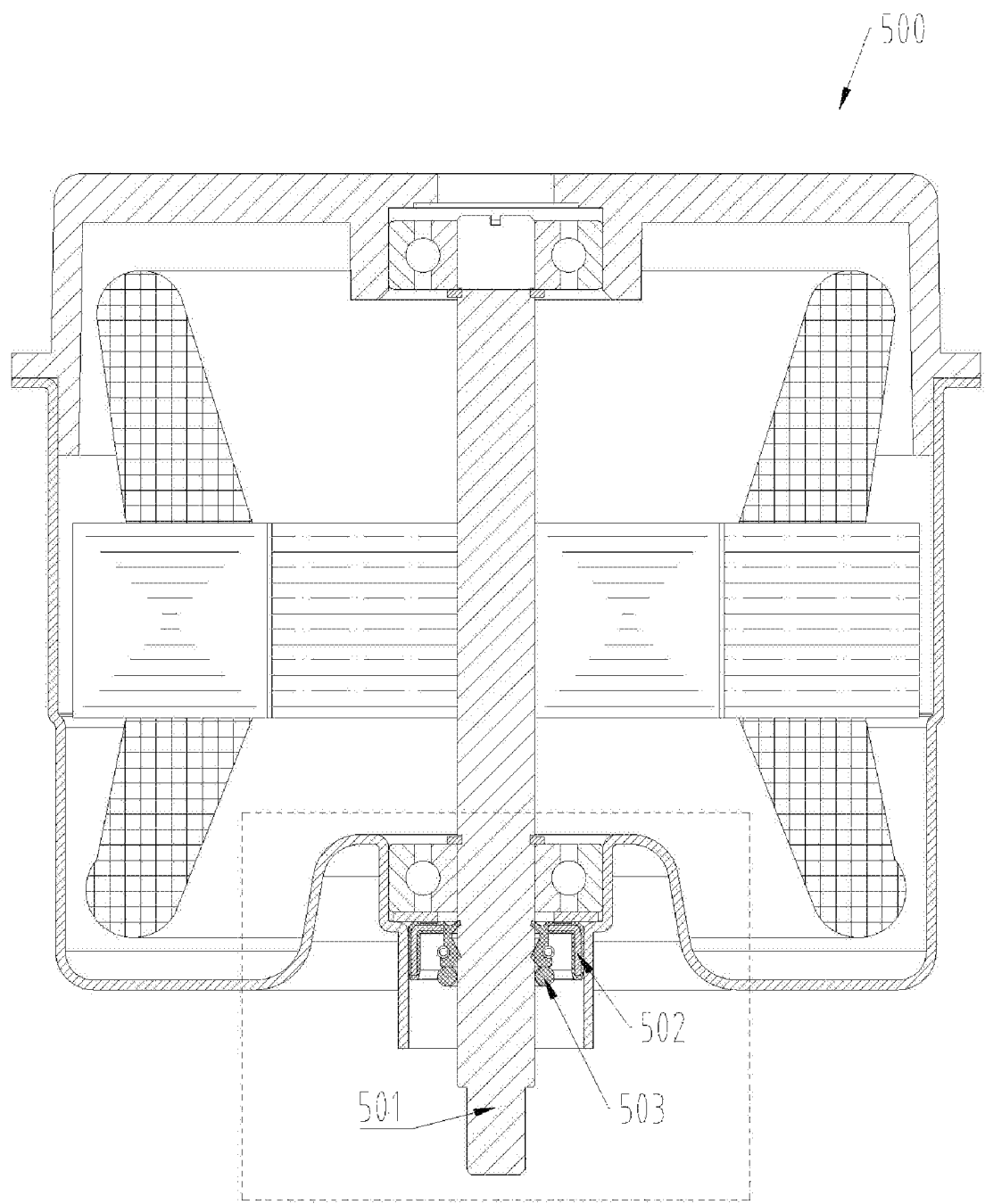
FIG. 5 is a cross-sectional view that illustrates an apparatus having a sealing assembly for a rotating shaft according to another embodiment of the present invention.

FIG. 5 is a cross-sectional view that illustrates an apparatus 500 having a sealing assembly for a rotating shaft according to another embodiment of the present invention. The apparatus 500 includes a rotating shaft 501, at least one rotating shaft seal 502 (one is shown), and a sealing device 303 used with the rotating shaft seal 502. The at least one rotating shaft seal 502 and the sealing device 503 collectively form a sealing assembly (sealing structure) for use with the rotating shaft 501. The rotating shaft 501 and the rotating shaft seal 502 may have similar structures as the rotating shaft 101 and the rotating shaft seal 102, respectively, shown in FIGS. 1 and 2 and described above; these components will not be described in further detail here.

Figure 6:
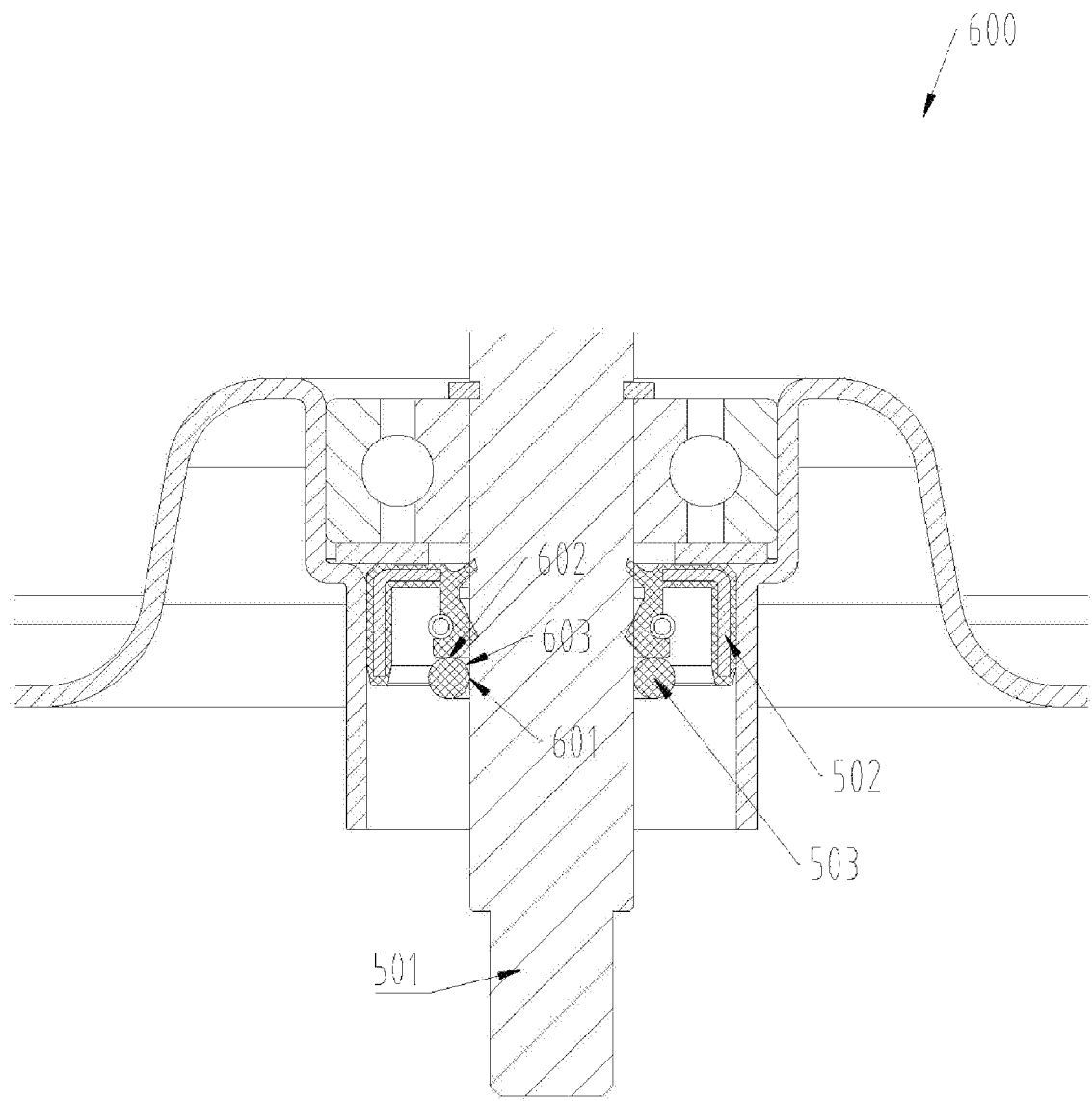
FIG. 6 is an enlarged cross-sectional view of a portion of the sealing assembly of FIG. 5.

FIG. 6 is an enlarged cross-sectional view of a portion 600 of the sealing assembly of FIG. 5. The sealing device 503 includes a ring shaped body, configured to have the rotating shaft 501 pass through it. The ring shaped body of the sealing device 503 defines a static sealing surface 601 which forms a static sealing cooperation with the rotating shaft 501, and also defines a dynamic sealing surface 602 which forms a dynamic sealing cooperation with a portion of the body of the rotating shaft seal 502 (e.g. the neighboring portion 202) that is adjacent to the sealing portion (e.g. the sealing portion 201) of the rotating shaft seal 502. In other words, the static sealing surface 601 tightly surrounds the rotating shaft 501 and rotates in synchrony with the rotating shaft 501 (i.e., the entire sealing device 503 rotates in synchrony with the rotating shaft 501).

In some embodiments, the ring shaped body of the sealing device 503 includes a flexible material. By providing the ring shaped body formed of the flexible material, a flexible seal is formed between the dynamic sealing surface 602 and the body of the rotating shaft seal 502. This can maintain a stable sealing effect under the influence of vibration of the mechanical apparatus and the change in the elastic force of the contact surface, and at the same time, reduce wear caused by the dynamic sealing cooperation. The flexible material may be selected from, for example, rubber, silica gel, and soft plastic. The rubber may be, without limitation, nitrile rubber, acrylic rubber, silicone rubber, fluororubber, neoprene, etc.

In some embodiments, the ring shaped body of the sealing device 503 further defines a connecting surface 603 which connects the static sealing surface 601 and the dynamic sealing surface 602. The connecting surface 603 has a curved shape in the cross-sectional view. In one example, the shapes of the static sealing surface 601 and the dynamic sealing surface 602 in the cross-sectional view are arcs on the same circle, and the connecting surface 603 has a curved shape. In another example, the cross-sectional shapes of the static sealing surface 601 and the dynamic sealing surface 602 may fall on a polygon, and the connecting surface 603 has a curved shape. The curved connecting surface 603 can relieve the stress generated due to the deformation when the dynamic sealing surface 602 contacts the body of the rotating shaft seal 502. This can prevent the deformation (e.g., displacement, or deformation of the sealing portion) of the rotating shaft seal 502 due to such stress, which may cause the rotating shaft seal 502 to fail.

The sealing device, sealing assembly and related apparatus incorporating the sealing assembly described above with reference to FIGS. 5 and 6 can effectively prevent wear of the rotating shaft seal and rotating shaft due to external contaminants, thereby extending the life of the rotating shaft seal and rotating shaft. The sealing assembly is also relatively easy to install, replace and maintain.

Figure 7:
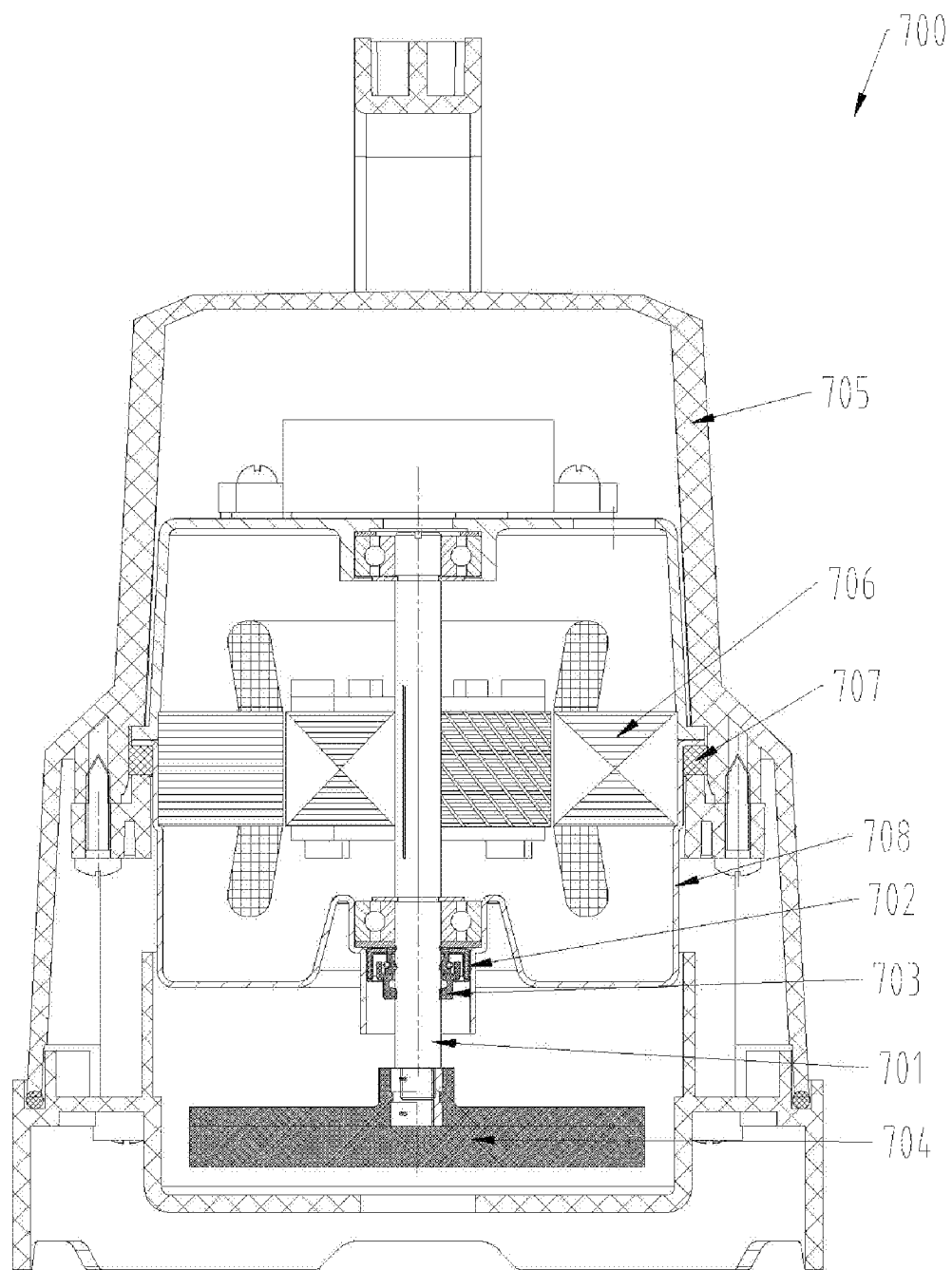
FIG. 7 is a cross-sectional view that illustrates an exemplary apparatus that uses a sealing assembly for a rotating shaft according to embodiments of the present invention.

FIG. 7 is a cross-sectional view that illustrates an exemplary apparatus 700 that uses a sealing assembly for a rotating shaft according to embodiments of the present invention. The exemplary apparatus 700 is a submerged water pump, and includes an electric motor rotating shaft 701, rotating shaft seal 702, sealing device 703, impeller 704 coupled to the electric motor rotating shaft 701, external sealing shell 705 of the pump, electrically energized components 706 of the electric motor (such as stator, rotator, conductor wires, capacitor, etc.), 0 ring 707, and front cover 708 of the electric motor. The rotating shaft seal 702 and sealing device 703 collectively form the sealing assembly for the rotating shaft 701. The rotating shaft 701 may be any of the rotating shafts 101, 301, and 501 of FIGS. 1-6. The rotating shaft seal 702 may be any of the rotating shaft seals 102, 302 and 502 of FIGS. 1-6. The sealing device 703 may be any of the sealing device 303 of FIGS. 3, 4 or the sealing device 503 of FIGS. 5, 6.

The electric motor rotating shaft 701 of the pump 700 drives the impeller 704 to rotate, which drives the water flow. During operation, the water pump is entirely submerged in water. Thus, the electrically energized portions need to be well sealed. As shown in FIG. 7, the electrically energized components 706 of the electrical motor are sealed between the external sealing shell 705 of the pump and the front cover 708 of the electric motor. The external sealing shell 705 and the electric motor front cover 708 are sealed with respect to each other by the 0 ring 707. This seal is a static seal. However, the dynamic seal between the electric motor rotating shaft 701 and the rotating shaft seal 702 can cause wear during rotation as discussed earlier, and external contaminants (dust, other contaminants, etc.) entering the dynamic sealing surface can exacerbate the wear. Unlike conventional technologies, in embodiments of the present invention, by introducing the sealing device 703 outside of the rotating shaft seal 702, the sealing device 703 cooperates with the rotating shaft 701 and the rotating shaft seal 702 in the manners described earlier, to effectively prevent external contaminants (dust, other contaminants, etc.) from entering the interface because the rotating shaft 701 and the rotating shaft seal 702. This effectively prevents failure of the rotating shaft seal 702 and ensures the tight sealing of the electrically energized components 706 of the electrical motor.

While the present invention is described above using specific examples, these examples are only illustrative and do not limit the scope of the invention. It will be apparent to those skilled in the art that various modifications, additions and deletions can be made to the sealing device, assembly and related apparatus of the present invention without departing from the spirit or scope of the invention.

What is claimed is:

1. A sealing device for use with a rotating shaft seal to seal a rotating shaft, wherein the rotating shaft seal includes a ring shaped body with the rotating shaft passing through it, and includes a sealing portion configured to form a dynamic sealing cooperation with the rotating shaft, the sealing device comprising:
    a ring shaped body, configured to accommodate the rotating shaft passing through it, the ring shaped body including a first ring shaped portion and a second ring shaped portion spaced apart from each other in an axial direction of a rotation axis of the rotating shaft,
    wherein the first ring shaped portion defines a static sealing surface configured to form a static sealing cooperation with the rotating shaft, and
    wherein the second ring shaped portion includes a flexible material that defines a dynamic sealing surface configured to form a dynamic sealing cooperation with a portion of the body of the rotating shaft seal that is adjacent to the sealing portion of the rotating shaft seal.

2. The sealing device of claim 1, wherein the ring shaped body further comprise:
    a transition portion that connects the first ring shaped portion and the second ring shaped portion, where the transition portion defines an inner surface that is concave in a cross-section that passes through the rotation axis of the rotating shaft.

3. The sealing device of claim 1, wherein the second ring shaped portion further includes a connecting surface disposed between the dynamic sealing surface and the concave surface.

4. The sealing device of claim 3, wherein the connecting surface is configured to form a gap between the connecting surface and the rotating shaft.

5. The sealing device of claim 1, wherein the ring shaped body further includes:
    a flange structure extending from an outer end of the dynamic sealing surface, wherein the flange structure extends parallel to the rotation axis towards the rotating shaft seal when the dynamic sealing surface and the body of the rotating shaft seal form a dynamic sealing cooperation.

6. A sealing assembly for use with a rotating shaft, the sealing assembly comprising:

a rotating shaft seal, having a ring shaped body configured to accommodate the rotating shaft passing through it, and including a sealing portion disposed in contact with the rotating shaft and configured to form a dynamic sealing cooperation with the rotating shaft;
    a sealing device, which includes:
        a ring shaped body, configured to accommodate the rotating shaft passing through it, the ring shaped body including a first ring shaped portion and a second ring shaped portion spaced apart from each other in an axial direction of a rotation axis of the rotating shaft,
        wherein the first ring shaped portion defines a static sealing surface configured to form a static sealing cooperation with the rotating shaft, and
        wherein the second ring shaped portion defines a dynamic sealing surface configured to form a dynamic sealing cooperation with a second portion of the body of the rotating shaft seal that is adjacent to the sealing portion of the rotating shaft seal.

7. The sealing assembly of claim 6, wherein the ring shaped body of the sealing device further comprise:
    a transition portion that connects the first ring shaped portion and the second ring shaped portion, where the transition portion defines an inner surface that is concave in a cross-section that passes through the rotation axis of the rotating shaft.

8. The sealing assembly of claim 7, wherein the second ring shaped portion further includes a connecting surface disposed between the dynamic sealing surface and the concave surface.

9. The sealing assembly of claim 8, wherein the connecting surface is configured to form a gap between the connecting surface and the rotating shaft.

10. The sealing assembly of claim 6, wherein the ring shaped body of the sealing device further includes:
    a flange structure extending from an outer end of the dynamic sealing surface, wherein the flange structure extends parallel to the rotation axis towards the rotating shaft seal when the dynamic sealing surface and the body of the rotating shaft seal form a dynamic sealing cooperation.

11. The sealing assembly of claim 6, wherein the second ring shaped portion includes a flexible material that defines the dynamic sealing surface.

12. An apparatus including a rotating shaft and the sealing assembly of claim 6.

13. An apparatus comprising:
    a rotating shaft;
    a rotating shaft seal, having a ring shaped body configured to accommodate the rotating shaft passing through it, and including a sealing portion disposed in contact with the rotating shaft and configured to form a dynamic sealing cooperation with the rotating shaft;
    a sealing device, which includes:
        a ring shaped body, configured to accommodate the rotating shaft passing through it,
        wherein the ring shaped body defines a static sealing surface configured to form a static sealing cooperation with the rotating shaft and defines a dynamic sealing surface configured to form a dynamic sealing cooperation with a second portion of the body of the rotating shaft seal that is adjacent to the sealing portion of the rotating shaft seal.

14. The apparatus of claim 13, wherein the ring shaped body of the sealing device includes a flexible material that defines the dynamic sealing surface.

15. The apparatus of claim 13, wherein the ring shaped body of the sealing device further defines a connecting surface which connects the static sealing surface and the dynamic sealing surface, and wherein the connecting surface has a curved shape in a cross-section that passes through the rotation axis of the rotating shaft.

16. The sealing assembly of claim 11, wherein the second portion of the body of the rotating shaft seal is formed of a flexible material, and wherein the dynamic sealing cooperation is formed between the flexible material of the second portion of the body of the rotating shaft seal and the flexible material of the second ring shaped portion of the sealing device.

17. The apparatus of claim 14, wherein the second portion of the body of the rotating shaft seal is formed of a flexible material, and wherein the dynamic sealing cooperation is formed between the flexible material of the second portion of the body of the rotating shaft seal and the flexible material of the ring shaped body of the sealing device.

* * * * *